United States Patent [19]
Golovko et al.

[11] 3,963,462

[45] June 15, 1976

[54] METHOD OF PURIFYING A NEON-HELIUM MIXTURE

[76] Inventors: Georgy Anatolievich Golovko, Pushkin, 8, bulvar A. Tolstogo, 16, kv. 29; Jury Yakovlevich Ignatov, ulitsa Kolomenskaya, 33/40, kv. 59, both of Leningrad, U.S.S.R.

[22] Filed: Feb. 5, 1975

[21] Appl. No.: 547,254

[30] Foreign Application Priority Data

Apr. 26, 1974  U.S.S.R............................ 2015807

[52] U.S. Cl......................................... 55/25; 55/58; 55/66; 55/68
[51] Int. Cl.².......................................... B01D 53/02
[58] Field of Search .................... 55/25, 58, 66, 68

[56] References Cited
UNITED STATES PATENTS

| | | | |
|---|---|---|---|
| 3,616,602 | 11/1971 | Hays | 55/66 |
| 3,838,553 | 10/1974 | Doherty | 55/66 |

*Primary Examiner*—John Adee
*Attorney, Agent, or Firm*—Steinberg and Blake

[57] ABSTRACT

A method of purifying a neon-helium mixture containing 2 to 7 vol.% of neon, 1 to 3 vol.% of helium, 0.5 to 1.5 vol.% of hydrogen, 88.5 to 96.5 vol.% of nitrogen, traces of oxygen and traces of hydrocarbons having from 1 to 5 carbon atoms by freeing said mixture from nitrogen, oxygen, hydrogen and hydrocarbons, which comprises removing nitrogen by dephlegmation at a temperature of from 67° to 77°K. and a pressure of 4 to 7 kgf/sq.cm. to give a mixture containing 68 to 74 vol.% of neon, 22 to 74 vol.% of helium, 1.5 to 2 vol.% of hydrogen, 1 to 8 vol.% of nitrogen and trace amounts of oxygen and hydrocarbons. The latter mixture is passed at a pressure of from 4 to 7 kgf/sq.cm. through microporous adsorbents having 3 to 9-A micropores, adsorbing the remaining nitrogen, oxygen, hydrogen and hydrocarbons. Then said impurities are desorbed by gradually reducing the pressure of the mixture from 4 to 7 kgf/sq.cm. down to $10^{-1}$ to $10^2$ mm Hg. The adsorption and desorption steps are effected with the microporous adsorbents being thermostated with liquid nitrogen.

12 Claims, No Drawings

METHOD OF PURIFYING A NEON-HELIUM MIXTURE

The present invention relates to the field of cryogenic engineering; more specifically, it is directed to a method of purifying a neon-helium mixture.

The method of this invention may be employed in cryogenic air fractionation for obtaining a pure neon-helium mixture.

It is widely known in the art to contains a neon-helium mixture containing 2 to 7 vol.% of neon, 1 to 3 vol.% of helium, up to 1.5 vol.% of hydrogen and traces of oxygen and hydrocarbons, nitrogen being the balance, by dephlegmating the bulk of nitrogen at a temperature of from 67° to 80° K. and a pressure of from 4 to 7 kgf/sq.cm. The overall concentration of neon, helium and hydrogen in the dephlegmator rises to 40 to 80 vol.% it depends above all on the quantity of the mixture and the condensation temperature determining the nitrogen vapour tension. The subsequent procedure of ridding the neon-helium mixture of nitrogen and oxygen involves secondary dephlegmation at a pressure of from 20 to 25 kgf/sq.cm., after which the mixture is passed through adsorbers packed with polydisperse activated charcoal having microporoes of size form 5 to 1,000 A wherein the residual nitrogen is adsorbed. The mixture thus purified contains about 70 vol.% of neon, 28 vol % of helium and 2 vol.% of hydrogen. The latter is usually removed by catalytic hydrogenation with the use of oxygen. The final step of purification of the neon-helium mixture comprises removing the reaction products and oil in additional adsorbers. Hydrogen may likewise be removed by catalytic hydrogenation prior to the secondary dephlegmation step.

The above-described prior art technique of purifying a neon-helium mixture has the following disadvantages:

— the neon-helium mixture to be purified has to be subjected to two steps of dephelgmation involving different pressures and temperatures;

— only nitrogen and oxygen can be removed in the adsorber;

— hydrogen is removed by an exothermic process of catalytic hydrogenation which requires that the neon-helium mixture should be subsequently dried and rid of the reaction products (oxygen) and compressor oil.

There exists another method (Bulgarian Inventor's Certificate No. 11,836 issued July 15, 1968) of purifying a neon-helium mixture withdrawn from an air-fractionating apparatus and containing 2 to 7 vol.% of neon, 1 to 3 vol.% of helium, 0.5 to 1.5 vol.% of hydrogen, 38.5 to 96.5 vol.% of nitrogen, traces of oxygen and traces of hydrocarbon with 1 to 5 carbon atoms, whereby said mixture is freed from nitrogen, oxygen and said hydrocarbons by removing the bulk of nitrogen from said neon-helium mixture by dephlegmation at a temperature of from 78° to 80°K. and a pressure of 5 kgf/sq.cm; after which the mixture is passed through the tubular space of an adsorber at a pressure of 5 kgf/sq.cm.

Nitrogen, oxygen and hydrocarbons are adsorbed on a microporous adsorbent, viz. activated polydisperse charcoal of pore size from 5 to 1,000 A, at a temperature of from 78° to 80° K. which is furnished by liquid nitrogen pumped into the intertubular space of the adsorber.

The adsorbed gases are desorbed by a stepwise reduction of the pressure of the mixture from 5 kgf/sq.cm. down to $10^{-1}$ to $10^{-2}$ mm Hg at a variable rising temperature, the temperature rise being provided for by substituting a heat carrier for the thermostating coolant.

The latter known technique, however, exhibits some disadvantages of which the following merit notice:

— adsorption is effected on activated charcoal having a polydisperse structure and designed for adsorbing primarily nitrogen;

— dephlegmation and adsorption are effected at a comparatively high temperature of 78° to 80° K., adversely affecting the degree of purification of the neon-helium mixture;

— adsorption on polydisperse activated charcoal fails to ensure total adsorption of hydrogen, necessitating an extra purification step to rid the neon-helium mixture of hydrogen;

— the use of polydisperse activated charcoal entails vigorous adsorption of neon and its losses in the course of desorption;

— desorption following each adsorption cycle is carried out at a variable rising temperature, disrupting the isothermality of the adsorption-desorption process and adversely affecting the economics of the process as a whole owing to the extra energy needed for heating and to provide for a higher flow of the cooling agent.

It is an object of the present invention to provide a method of purifying a neon-helium mixture such as would enable the mixture to be simultaneously stripped of nitrogen, oxygen, hydrocarbons and hydrogen.

It is a further object of the present invention to simplify the flowchart and improve the efficiency of the process for the purification of a neon-helium mixture.

These vol.% of helium other objects are attained by the provision of a method of purifying a neon-helium mixture containing 2 to 7 vol.% of neon, 10to 30vol. % of helium 0.5 to 1.5 vol.% of hydrogen, 88.5 to 96.5 vol.% of nitrogen, traces of oxygen and traces of hydrocarbons with 1 to 5 carbon atoms, by ridding said mixture of the nitrogen, oxygen and said hydrocarbons, which comprises removing the nitrogen from the neon-helium mixture by dephlegmation at a temperature of from 67° to 77° K. and a pressure of from 4 to 7 kgf/sq.cm; obtaining a mixture containing 68 to 74 vol.% of neon, 22 to 24 vol.% of helium, 1.5 to 2 vol.% of hydrogen, 1 to 8 vol.% of nitrogen, traces of oxygen and traces of said hydrocarbons; and passing said latter mixture at a pressure of from 4 to 7 kgf/sq.cm. through microporous adsorbents, thereby adsorbing the remaining nitrogen, oxygen and said hydrocarbons, after which the nitrogen, oxygen and hydrocarbons are desorbed by a stepwise reduction of the pressure of the neon-helium mixture from 4 to 7 kgf/sq.cm down to $10^{-7}$ to $10^{-2}$ mm Hg, the adsorption step being effected with the microporous adsorbents being thermostated with the aid of a cooling agent, viz. liquid nitrogen, whereby, in accordance with the invention, the adsorption step is effected with the use of microporous adsorbents having micropores of size from 3 to 9 A which are capable of simultaneously adsorbing hydrogen as well, and the desorption step is carried out with the adsorbents being likewise temperature-controlled with liquid nitrogen.

The microporous adsorbents employed at the adsorption step which have micropores of size from 3 to 9 A permit ridding the neon-helium mixture of nitrogen, oxygen, hydrocarbons and hydrogen.

The isothermal conditions of the desorption stage, i.e. with the adsorbents being temperature-controlled with a cooling agent, improve the economics of the purification process.

The adsorption process is preferably conducted at a temperature of the microporous adsorbents of from 67° to 77°K., which improves the dynamic activity of the adsorbents and raises the degree of purification of the neon-helium mixture.

The adsorption step is desirably effected on two layers of microporous adsorbents, the upstream one, with respect to the direction of flow of the neon-helium mixture, comprising microporous adsorbents having micropores of size from 5 to 9 A and the other layer having micropores of size from 3 to 5 A, with the height ratio of the layers being from 1:1 to 1:10.

Such a structure of the adsorbent bed makes it possible to selectively adsorb nitrogen, oxygen and hydrocarbons on the adsorbents of micropore size from 5 to 9 A, and hydrogen on the adsorbents of micropore size from 3 to 5 A.

The recommended microporous adsorbents with a micropore size of from 5 to 9 are synthetic zeolites of which the CaA and NaX zeolites are the most effective.

The recommended microporous adsorbents of micropore size from 3 to 5 A are constituted by polymeric activated charcoal.

The stepwise pressure reduction in the course of desorption may be effected in two steps: first, the pressure is reduced from 4 to 7 kgf/sq.cm. down to the atmospheric level, removing the nitrogen, oxygen, hydrogen and said hydrocarbons thereby desorbed; after which the pressure is reduced from the atmospheric level down to $10^{-1}$ to $10^{-2}$ mm Hg, removing the nitrogen, oxygen, hydrogen and hydrocarbons thereby desorbed.

In order to raise the coefficient of extraction of neon and helium from the mixture, the stepwise pressure reduction in the course of desorption is preferably effected in two or three steps as follows: first, the pressure is reduced from 4 to 7 kgf/sq.cm. down to 2 to 5 kgf/sq.cm., removing the nitrogen, oxygen, hydrogen and hydrocarbons, thereby desorbed and admixing same with the parent neon-helium mixture; then, should a three-step pressure reduction flowchart be employed, the pressure is reduced from 2 to 5 kgf/sq.cm. down to the atmospheric level, removing the nitrogen, oxygen, hydrogen and hydrocarbons thereby desorbed; after which, irrespective of the number of steps, the pressure is reduced to $10^{-1}$ to $10^{-2}$ mm Hg, removing the gases being desorbed.

In order that the adsorbents may regain their initial properties, it is desirable, in case of a three-step pressure reduction procedure, that the liquid nitrogen supply into the intertubular space of the adsorber be discontinued from time to time, with a gaseous heat carrier being supplied instead, thereby raising the temperature of said microporous adsorbents to 270° to 300°K., after which the liquid nitrogen supply is resumed.

The recommended gaseous heat carrier is air of nitrogen having a temperature of 300° to 350°K.

Said method of purifying a neon-helium mixture permits considerably simplifying the purification flowchart and totally stripping the parent mixture of nitrogen, hydrogen, oxygen and hydrocarbon impurities on two adsorbent layers to yield a pure neon-helium mixture containing in excess of 99.9 percent of the chief products. The stepwise principle of desorption utilized in the method of this invention conduces to a higher coefficient of extraction of neon and helium from the parent neon-helium mixture. With the desorption step being effected almost entirely under isothermal conditions, the efficiency of the process as a whole is largely improved.

The proposed method of purifying a neon-helium mixture is preferably embodied as follows.

A neon-helium mixture withdrawn e.g. from an air-fractionating apparatus and containing 2 to 7 vol.% of neon, 1 to 3 vol.% of helium, 0.5 to 1.5 vol.% of hydrogen, 88.5 to 96.5 vol.% of nitrogen, traces of oxygen and traces of hydrocarbons with 1 to 5 carbon atoms is delivered into a dephlegmator wherein the nitrogen is dephlegmated through the boiling of a cooling agent, viz. liquid nitrogen. Nitrogen dephlegmation from the parent neon-helium mixture proceeds at a temperature of from 67° to 77°K. controllable by varying the pressure of the cooling agent, viz. liquid nitrogen, with the aid of a vacuum pump. The starting neon-helium mixture may be delivered to the dephlegmator either in a direct flow or in a counterflow. In this case the pressure of the neon-helium mixture flow in the range from 4 to 7 kgf/sq.cm. is determined by the operating conditions of the main air-fractionating apparatus.

After the dephlegmation step, the neon-helium mixture now containing 68 to 74 vol % of neon, 22 to 24 vol.% of helium, 1 to 2 vol.% of hydrogen, 1 to 7 vol.% of nitrogen, traces of oxygen and traces of hydrocarbons, is supplied into either one of two parallel-operating adsorbers wherein the mixture is stripped of nitrogen, hydrogen, oxygen and hydrocarbons on a layer of microporous adsorbents of micropore size 3 to 9 A at a temperature of from 67° to 77°K. and a pressure of from 4 to 7 kgf/sq.cm.

If the neon-helium mixture is to be maximally rid of hydrogen, impurity adsorption is preferably effected on two adsorbent layers.

On the first layer composed of microporous adsorbent of micropore size 5 to 9 A, the nitrogen, oxygen and hydrocarbons having 1 to 5 carbon atoms are adsorbed; whereas on the second layer of microporous adsorbent of microporous size 3 to 5 A, hydrogen is adsorbed.

The microporous adsorbents of micropore size 5 to 9 A may be synthetic zeolites of type NaX, CaA or ultramicroporous glass; while the microporous adsorbents of micropore size 3 to 5 A may be polymeric activated charcoal with a highly developed microporous structure. Both layers exhibit selectively with respect to the components being adsorbed. The height ratio of the adsorbent layers varies from 1:1 to 1:10 depending on the concentration ratio predominantly of nitrogen and hydrogen at the inlet of the adsorber, as well as on the type of adsorbents employed and the operating parameters of the purification procedure.

The neon-helium mixture is stripped of nitrogen, hydrogen, oxygen and hydrocarbons in one adsorber, while in the other adsorber said impurities are desorbed.

The nitrogen, hydrogen, oxygen and hydrocarbon impurities are desorbed at the adsorption temperature (67° to 77°K.) by reducing the pressure of the mixture in three steps:

1. Pressure reduction from 4 to 7 kgf/sq.cm. down to 2 to 5 kgf/sq.cm. and removal from the the adsorber of part of neon and helium filling the intergranular space of the adsorber as well as of part of the nitrogen, oxygen, hydrogen and hydrocarbons desorbed in the process; delivery of said mixture enriched in neon and helium to the parallel adsorber wherein said mixture is admixed with the neon-helium mixture arriving from the dephlegmator. Thus, the first desorption step improves the coefficient of extraction of neon and helium; besides, the 25 to 50-percent pressure reduction entails but an insignificant rate of desorption of nitrogen, hydrogen, oxygen and hydrocarbons and thus fails to affect the subsequent operation of the parallel adsorber.

2. Pressure reduction from 2 to 5 kgf/sq.cm. down to the atmospheric level and removal from the adsorber of the desorbed nitrogen, oxygen, hydrogen and hydrocarbons as well as of part of neon and helium filling the intergranular space of the adsorber. The desorbed gases are either vented to the atmosphere or delivered to a gas holder to be subsequently admixed with the starting neon-helium mixture.

3. Pressure reduction from the atmospheric level down to $10^{-1}$ to $10^{-2}$ mm Hg and removal from the adsorber of the desorbed nitrogen, hydrogen, oxygen and hydrocarbons as well as of an insignificant proportion of the neon and helium. The pressure reduction at this step is effected with the aid of a vacuum pump, with the gases being desorbed escaping to the atmosphere.

Isothermal desorption may likewise be carried out in two steps by two methods:

1. The pressure of the mixture is reduced from 4 to 7 kgf/sq.cm. down to the atmospheric level, and the neon and helium as well as the desorbed nitrogen, oxygen, hydrocarbons and hydrogen are removed from the adsorber, whereupon the pressure is reduced from the atmospheric level down to $10^{-1}$ to $10^{-2}$ mm Hg, and said desorbed gases are vented to the atmosphere.

2. The pressure is reduced from 4 to 7 kgf/sq.cm. down to 2 to 5 kgf/sq.cm., and neon, helium and the desorbed gases are removed from the adsorber and admixed with the starting neon-helium mixture; the pressure is reduced from 2 to 5 kgf/sq.cm. down to $10^{-1}$ to $10^{-2}$ mm Hg, and said desorbed gases are removed.

In the course of the adsorption-desorption procedure the adsorbent is cooled down to a temperature of 67° to 77°K. which is maintained within said limits by varying the pressure over the boiling cooling agent, viz. liquid nitrogen, with the aid of a vacuum pump.

Periodically, once every 1 to 10 cycles, the adsorbents are partially regenerated by being heated to a temperature of from 270° to 300°K. for 4 to 5 hours. Such an operation enables the adsorbents to completely regain their initial properties, whereas in isothermal desorption a certain part of the adsorbent capacity is not utilized in the course of adsorption.

Incomplete regeneration is carried out in three steps. The first and second steps are effected in exactly the same manner as in isothermal desorption, but the third step is carried out as follows: after the vacuum pump has been switched on, the supply of liquid nitrogen into the intertubular space of the adsorber is discontinued, and a gaseous heat carrier, usually air or nitrogen, having a temperature of 300° to 350°K, is supplied into said intertubular space of the adsorber raising the temperature of the adsorbents to 270° to 300°K. The pressure is reduced down to $10^{-1}$ to $10^{-2}$ mm Hg at a temperature of 270° to 300°K. for 4 to 5 hours, after which the liquid nitrogen supply is resumed.

The pure neon-helium mixture produced in the above-described manner and containing at least 99.9 vol.% of neon and helium (70 vol.% of neon and 30 vol.% of helium) may be employed for the production of pure neon and helium by either of the known techniques, i.e. condensation or adsorption, or else it may be utilized as a protective medium, in leak detectors, as a cooling agent, etc.

The present invention will be further understood from the following detailed description of specific embodiments thereof illustrating the proposed method.

Example 1

A neon-helium mixture containing 7 vol.% of neon, 3 vol.% of helium, 1.5 vol.% of hydrogen, 88.5 vol.% of nitrogen, traces of oxygen and traces of hydrocarbons with 1 to 5 carbon atoms (ethylene, propylene, etc.) is supplied into a dephlegmator wherein the nitrogen is removed from the mixture at a temperature of 67°K. and a pressure of 7 kgf/sq.cm.

The mixture emerging from the dephlegmator contains 73 vol.% of neon, 24 vol.% of helium, 2 vol.% of hydrogen, 1 vol.% of nitrogen, traces of oxygen and traces of hydrocarbons. This mixture is supplied at a pressure of 7 kgf/sq.cm. and at a rate of 0.5 m/min into the tubular space of an adsorber packed with two layers of adsorbents temperature-controlled with liquid nitrogen and having a temperature of 67°K. The first layer is made up of synthetic NaX zeolite of micropore size 9 A, while the other layer is made up of polymeric activated charcoal with a highly developed microporous structure of micropore size 3 to 5 A, the height ratio of the adsorbent layers being 1:1.

The mixture emerging from the adsorber is a neon-helium mixture containing not greater than $1 \times 10^{-6}$ parts by volume of nitrogen, oxygen, hydrocarbons and hydrogen overall. The adsorption capacity of the NaX zeolite in terms of nitrogen is 78 kg/cu.m., whereas that of the polymeric activated charcoal in terms of hydrogen is 56 kg/cu.m.

If at the outlet of the adsorber the concentration of one of the impurities rises, the units of the apparatus are changed over with the working adsorber switched into a desorption mode.

The desorption of the nitrogen, oxygen, hydrocarbons and hydrogen is carried out with the adsorbents being thermostated with liquid nitrogen, providing for an adsorbent temperature of 77°K. in a stepwise pressure reduction. First, the pressure is reduced from 7 down to 5 kgf/sq.cm., and about 30 percent of the neon-helium mixture filling the intergranular space of the adsorber as well as the desorbed nitrogen, oxygen, hydrocarbons and hydrogen are removed from the adsorber and admixed with the neon-helium mixture being simultaneously supplied into the parallel adsorber. Then the pressure is reduced from 5 kgf/sq.cm. down to the atmospheric level, and the nitrogen, oxygen, hydrocarbons and hydrogen thereby desorbed are removed from the adsorber. After this the pressure is reduced from the atmospheric level down to $10^{-2}$ mm Hg, and the remaining neon, helium as well as the desorbed nitrogen, oxygen, hydrocarbons and hydrogen are all withdrawn from the adsorber. The neon and helium losses do not exceed 10 percent by volume.

In the next adsorption-desorption cycle, the total quantity of nitrogen, oxygen, hydrogen and hydrocarbon impurities in the pure neon-helium mixture does not exceed $5 \times 10^{-5}$ parts by volume; the adsorption capacity of the NaX zeolite in terms of nitrogen is 21 kg/cu.m., and the adsorption capacity of the polymeric activated charcoal in terms of hydrogen is 14 kg/cu.m.

Example 2

A neon-helium mixture containing 4 vol.% of neon, 2 vol.% of helium, 1 vol.% of hydrogen, 93 vol.% of nitrogen, traces of oxygen and traces of light hydrocarbons is supplied into a dephlegmator wherein the nitrogen is removed from the mixture at a temperature of 73°K. and a pressure of 5 kgf/sq.cm.

The mixture emerging from the dephlegmator contains 70.5 vol.% of neon, 23 vol.% of helium, 1.5 vol.% of hydrogen, 5 vol.% of nitrogen, traces of oxygen and traces of hydrocarbons. This mixture is supplied into the tubular space of an adsorber at a pressure of 5 kgf/sq.cm. and at a rate of 0.5 m/min, the tubular space of the adsorber being packed with two layers of adsorbents thermostated with liquid nitrogen at a temperature of 73°K. The upstream layer consists of synthetic CaA zeolite of micropore size 5 A, while the other layer consists of polymeric activated charcoal of micropore size 3 to 5 A, the height ratio of the adsorbent layers being 1:5.

The purified neon-helium mixture emerging from the adsorber has an overall quantity of nitrogen, oxygen, hydrogen and hydrocarbon impurities not exceeding 3 × 10$^{-6}$ parts by volume. The adsorption capacity of the CaA zeolite in terms of nitrogen is 71 kg/cu.m., while that of the polymeric activated charcoal is terms of hydrogen is 50 kg/cu.m.

The desorption of the nitrogen, oxygen, hydrocarbons and hydrogen is carried out in two steps with the adsorbents being temperature-controlled with liquid nitrogen at 73°K. At the first step, the pressure is reduced from 5 to 3 kgf/sq.cm., and about 40 percent of the neon-helium mixture filling the intergranular space of the adsorber as well as the desorbed nitrogen, oxygen, hydrocarbons and hydrogen are all withdrawn from the adsorber and admixed with the neon-helium mixture simultaneously supplied into a parallel adsorber. Then the pressure is reduced from 3 kgf/sq.cm. down to 10$^{-1}$ to 10$^{-2}$ Hg, and the neon, helium as well as the desorbed nitrogen, oxygen, hydrocarbons and hydrogen are all withdrawn from the adsorber.

After 1 to 5 adsorption-desorption cycles the total quantity of nitrogen, oxygen, hydrogen and hydrocarbon impurities in the purified neon-helium mixture does not exceed 1 × 10$^{-4}$ parts by volume.

The adsorption capacity of the CaA zeolite in terms of nitrogen is 17 kg/cu.m., while that of the polymeric activated charcoal in terms of hydrogen is 13 kg/cu.m. The neon and helium losses do not exceed 8 percent by volume.

Example 3

A neon-helium mixture containing 2 vol.% of neon, 1 vol.% of helium, 0.5 vol.% of hydrogen, 96.5 vol.% of nitrogen, traces of oxygen and traces of light hydrocarbons is supplied into a dephlegmator wherein the mixture is stripped of the nitrogen at a temperature of 77°K. and a pressure of 4 kgf/sq.cm.

The mixture emerging from the dephlegmator and containing 68 vol.% of neon, 23 vol.% of helium, 1 vol.% of hydrogen, 8 vol.% of nitrogen, traces of oxygen and traces of hydrocarbons is delivered into the tubular space of an adsorber at a pressure of 4 kgf/sq.cm. and at a rate of 0.5 m/min, the tubular space of the adsorber being packed with two layers of adsorbents temperature-controlled with liquid nitrogen to 77°K. The first layer of the adsorbents consists of synthetic CaX zeolite of micropore size 9 A, while the other layer is made up of polymeric activated charcoal of micropore size 3to 5 A, the height ratio of the adsorbent layers being 1:10.

The purified neon-helium mixture emerging from the adsorber contains not greater than 1 × 10$^{-5}$ parts by volume of nitrogen, oxygen, hydrogen and hydrocarbon impurities overall.

The adsorption capacity of the CaX zeolite in terms of nitrogen is 59 kg/cu.m., while the adsorption capacity of the polymeric activated charcoal in terms of hydrogen is 53 kg/cu.m.

The desorption of the nitrogen, oxygen, hydrocarbons and hydrogen is carried out at a temperature of 77°K. by stepwise pressure reduction in three steps. First, the pressure is reduced from 4 to 2 kgf/sq.cm., and about 50 percent of the neon-helium mixture filling the intergranular space of the adsorber as well as the desorbed nitrogen, oxygen, hydrocarbons and hydrogen are removed from the adsorber and admixed with the neon-helium mixture simultaneously supplied to a parallel adsorber. Then the pressure is reduced from 2 kgf/sq.cm. down to the atmospheric level, and the neon and helium as well as the desorbed nitrogen, oxygen, hydrocarbons and hydrogen are removed from the adsorber. After that the pressure is reduced from the atmospheric level down to 10$^{-1}$ mm Hg, the liquid nitrogen supply to the intertubular space of the adsorber is discontinued, and air having a temperature of 350°K. is supplied into the intertubular space of the adsorber. The temperature of the adsorbents is raised to 300°K. and maintained at this level for 5 hours, after which the liquid nitrogen supply is resumed, with the initial properties of the adsorbents now almost completely recovered.

In the next adsorption-desorption cycle the total quantity of nitrogen, oxygen, hydrogen and hydrocarbon impurities in the purified neon-helium mixture does not exceed 2 × 10$^{-5}$ parts by volume. The adsorption capacity of the CaX zeolite in terms of nitrogen is 58 kg/cu.m., while that of the polymeric activated charcoal in terms of hydrogen is 52.5 kg/cu.m. The neon and helium losses do not exceed 7 percent by volume.

Example 4

A neon-helium mixture containing 7 vol.% of neon, 3 vol.% of helium, 0.5 vol.% of hydrogen, 89.5 vol.% of nitrogen, traces of oxygen and traces of light hydrocarbons is supplied into a dephlegmator wherein the mixture is stripped of the nitrogen at a temperature of 67° K. and a pressure of 7 kgf/sq.cm.

The mixture emerging from the dephlegmator and containing 74 vol.% of neon, 24 vol.% of helium, 1 vol.% of hydrogen 1 vol.% of nitrogen, traces of oxygen and traces of hydrocarbons is passed at a pressure of 7 kgf/sq.cm. through a layer of synthetic CaA zeolite of micropore size 5 A temperature-controlled with liquid nitrogen at 67° K.

The total quantity of nitrogen, oxygen and hydrocarbons in the purified neon-helium mixture does not exceed 5 × 10$^{-5}$ parts by volume, and the level of hydrogen does not exceed 1 × 10$^{-3}$ parts by volume.

The adsorption capacity of the CaA zeolite in terms of nitrogen is 69 kg/cu.m. and in terms of hydrogen 4.5 kg/cu.m.

The desorption procedure, duplicating that of Example 1, in the subsequent 5 to 9 adsorption-desorption cycles allows a reduction of the quantity of the nitrogen, oxygen and hydrocarbon impurities in the purified neon-helium mixture to $4 \times 10^{-4}$ parts by volume and the level of hydrogen down to $5 \times 10^{-4}$ parts by volume.

After 5 to 9 operating cycles, the adsorption capacity of the CaA zeolite in terms of nitrogen becomes 16 kg/cu.m. and in terms of hydrogen 0.5 kg/cu.m.

Heating of the CaA zeolite to a temperature of 270° K. with the aid of gaseous nitrogen having a temperature of 300°K. practically fully restores the adsorption properties of the zeolite, so that the overall quantity of nitrogen, oxygen and hydrocarbon impurities in the purified neon-helium mixture can be additionally reduced to $5 \times 10^{-6}$ parts by volume and that of hydrogen to $1.5 \times 10^{-3}$ parts by volume, the adsorption capacity of the CaA zeolite in terms of nitrogen being 67 kg/cu.m. and in terms of hydrogen 4 kg/cu.m.

The losses of neon and helium do not exceed 7 to 10 percent by volume.

Example 5

A neon-helium mixture containing 7 vol.% of neon, 3 vol.% of helium, 0.5 vol.% of hydrogen, 89.5 vol.% of nitrogen, traces of oxygen and traces of light hydrocarbons is stripped of the nitrogen by dephlegmation at a temperature of 77° K. and a pressure of 6 kgf/sq.cm.

The mixture emerging from the dephlegmator contains 70 vol.% of neon, 20 vol.% of helium, 1 vol.% of hydrogen, 8 vol.% of nitrogen, traces of oxygen and traces of hydrocarbons. This mixture is passed at a pressure of 6 kgf/sq.cm. through a layer of synthetic NaX zeolite of micropore size 9 A temperature-controlled with liquid nitrogen at a temperature of 77° K.

The total quantity of nitrogen, oxygen and hydrocarbon impurities in the purified neon-helium mixture does not exceed $1 \times 10^{-5}$ parts by volume, while the level of hydrogen is $5 \times 10^{-4}$ parts by volume. The adsorption capacity of the NaX zeolite in terms of nitrogen is 60 kg/cu.m. and interms of hydrogen 3 kg/cu.m.

The desorption procedure at a temperature of 77° k. in two steps duplicates that of Example 2; carried out in the subsequent 2 to 5 adsorption-desorption cycles, it allows a reduction of the overall quantity of nitrogen, oxygen and hydrocarbons in the purified neon-helium mixture down to $5 \times 10^{-4}$ parts by volume, and the hydrogen level down to $1 \times 10^{-3}$ parts by volume. The adsorption capacity of the NaX zeolite in terms of nitrogen drops to 15 kg/cu.m. and in terms of hydrogen to 0.4 kg/cu.m.

Heating of the NaX zeolite to a temperature of 280° K. with air having a temperature of 310° K. practically fully restores to the zeolite its adsorption properties, so that the overall quantity of the nitrogen, oxygen and hydrocarbon impurities is further reduced down to $5 \times 10^{-4}$ parts by volume. and that of hydrogen down to $1 \times 10^{-3}$ parts by volume; the adsorption capacity of the NaX zeolite in terms of nitrogen is 60 kg/cu.m. and in terms of hydrogen 2.5 kg/cu.m.

The losses of neon and helium do not exceed 8 percent by volume.

Example 6

Purification of a neon-helium mixture of a composition similar to that of the mixture of Example 1 in a procedure duplicating that of Example 1 is carried out, with the pressure reduction in desorption being effected in a single step from 7 kgf/sq.cm. down to $10^{-2}$ mm Hg.

Such a desorption method does not affect the quantity of purification or the adsorption capacity of the adsorbents, but the relative losses of neon and helium increase threefold.

What is claimed is:

1. A method of purifying a neon-helium mixture containing 2 to 7 vol.% of neon, 1 to 3 vol.% of helium, 0.5 to 1 vol.% of hydrogen, 88.5 to 96.5 vol.% of nitrogen, traces of oxygen and traces of hydrocarbons with 1 to 5 carbon atoms by freeing said mixture from the nitrogen, oxygen, hydrogen and said hydrocarbons, which comprises removing the nitrogen from said neon-helium mixture by dephlegmation at a temperature of from 67° to 77° K. and a pressure of 4 to 7 kgf/sq.cm.; obtaining a mixture containing 68 to 74 vol.% of neon, 22 to 74 vol.% of helium, 1.5 to 2 vol.% of hydrogen, 1 to 8 vol.% of nitrogen traces of oxygen and traces of said hydrocarbons; passing said mixture at a pressure of from 4to 7 kgf/sq.cm. through microporous adsorbents having micropores of size from 3 to 9 A, adsorbing the remaining nitrogen, oxygen, hydrogen and said hydrocarbons; desorbing the nitrogen, oxygen, hydrogen and hydrocarbons by a stepwise reduction of the pressure of said mixture from 4 to 7 kgf/sq.cm. down to $10^{-1}$ to $10^{-2}$ mm Hg, the adsorption and desorption steps being effected with the microporous adsorbents being thermostated with the aid of a cooling agent, viz. liquid nitrogen.

2. A method as claimed in claim 1, whereby the adsorption procedure is effected at a temperature of the microporous adsorbents of from 67° to 77° K.

3. A method as claimed in claim 1, whereby the adsorption procedure is effected on two layers of microporous adsorbents of which the upstream one, with respect to the direction of flow of the neon-helium mixture, comprises microporous adsorbents of micropore size from 5 to 9 A, whereas the other layer has micropores of size 3 to 5 A, with the height ratio of the layers being from 1:1 to 1:10.

4. A method as claimed in claim 3, whereby the microporous adsorbents of micropore size from 5 to 9 A are synthetic zeolities.

5. A method as claimed in claim 4, whereby synthetic CaA zeolite is employed.

6. A method as claimed in claim 4, whereby synthetic NaX zeolite is employed.

7. A method as claimed in claim 3, whereby the microporous adsorbents of micropore size from 3 to 5 A are constiuted by polymeric activated charcoal.

8. A method as claimed in claim 1, whereby the stepwise pressure reduction in desorption is effected in two steps: first, the pressure is reduced from 4 to 7 kgf/sq.cm. down to the atmospheric level, removing the nitrogen, oxygen, hydrogen and said hydrocarbons thereby desorbed; after whith the pressure is reduced from the atmospheric level down to $10^{-1}$ to $10^{-2}$ Hg, removing the nitrogen, oxygen, hydrogen and hydrocarbons being thereby desorbed.

9. A method as claimed in claim 1, whereby the stepwise pressure reduction in desorption is effected in two steps: first, the pressure is reduced from 4 to 7 kgf/sq.cm. down to 2 to 5 kgf/sq.cm., removing the nitrogen, oxygen, hydrogen and said hydrocarbons thereby desorbed and admixing same with the parent neon-helium mixture; then the pressure is reduced from 2 to 5 kgf/sq.cm. down to $10^{-1}$ to $10^{-2}$ mm Hg, removing the nitrogen, oxygen, hydrogen and hydrocarbons thereby desorbed.

10. A method as claimed in claim 1, whereby the stepwise pressure reduction in desorption is effected in three steps: first, the pressure is reduced from 4 to 7 kgf/sq.cm. down to 2 to 5 kgf/sq.cm., removing the nitrogen, oxygen, hydrogen and said hydrocarbons thereby desorbed and admixing same with the parent neon-helium mixture; then the pressure is reduced from 2 to 5 kgf/sq.cm. down to the atmospheric level, removing the nitrogen, oxygen, hydrogen and hydrocarbons being thereby desorbed, and lastly, the pressure is reduced from the atmospheric level down to $10^{-1}$ to $10^{-2}$ mm Hg, removing the nitrogen, oxygen, hydrogen and hydrocarbons being thereby desorbed.

11. A method as claimed in claim 10, whereby after the second step of desorption the thermostating of the adsorbents with liquid nitrogen is discontinued and the adsorbents are thermostated with a gaseous heat carrier, thereby raising the temperature of the microporous adsorbents to 270° to 300° K., after which the thermostating with liquid nitrogen is resumed.

12. A method as claimed in claim 11, whereby the gaseous heat carrier is a gas selected from the group consisting of air and nitrogen and having a temperature of 300° to 350° K.

* * * * *